United States Patent [19]

Fujisaku et al.

[11] Patent Number: 4,684,935
[45] Date of Patent: Aug. 4, 1987

[54] COMBINED GRAPHIC AND TEXTUAL DISPLAY SYSTEM

[75] Inventors: Kiminori Fujisaku, Inagi; Makoto Awaga, Yokohama; Shosuke Mori, Tokyo, all of Japan

[73] Assignee: Fujitsu Limited, Kawasaki, Japan

[21] Appl. No.: 552,974

[22] Filed: Nov. 17, 1983

[30] Foreign Application Priority Data

Nov. 17, 1982 [JP] Japan .................. 57-201739

[51] Int. Cl.$^4$ .................................. G09G 1/00
[52] U.S. Cl. .................... 340/717; 340/721; 340/745
[58] Field of Search ............. 340/717, 721, 745, 729, 340/798, 799, 803; 358/182, 183

[56] References Cited

U.S. PATENT DOCUMENTS

| | | | |
|---|---|---|---|
| 3,539,999 | 11/1970 | Houldin et al. ............. | 340/717 |
| 3,624,632 | 11/1971 | Ophir .......................... | 340/745 |
| 3,686,662 | 8/1972 | Blixt et al. .................... | 340/745 |
| 3,961,133 | 6/1976 | Bennett ........................ | 358/183 |
| 4,439,760 | 3/1984 | Fleming ....................... | 340/717 |
| 4,470,042 | 9/1984 | Barnich et al. .............. | 340/745 |
| 4,484,187 | 11/1984 | Brown et al. ................ | 340/721 |
| 4,490,797 | 12/1984 | Staggs et al. ................. | 340/721 |
| 4,498,081 | 2/1985 | Fukushima et al. ......... | 340/799 |

*Primary Examiner*—Marshall M. Curtis
*Attorney, Agent, or Firm*—Staas & Halsey

[57] ABSTRACT

A display system comprises a first image memory storing first image data, a second image memory storing second image data operable independently from the first image memory, a display selection and combination circuit, and two display units. The display selection and combination circuit connected to the first and second image memories is formed such that each of the display units displays a combination of data from the image memories according to a display request. Normally, the display units are cathode ray tubes or liquid crystal displays. Usually, one of the first and second image memories stores character information, such as letters and numerals, and the other stores graphic information, such as figures and curves.

2 Claims, 7 Drawing Figures

| DISTRIBUTION OF SOLD | | | | | |
|---|---|---|---|---|---|
| | STORE1 | STORE2 | STORE3 | STORE4 | SUM |
| MON | XXXX | XXXX | XXXX | XXXX | XXXXX |
| TUE | XXXX | XXXX | XXXX | XXXX | XXXXX |
| WED | XXXX | XXXX | XXXX | XXXX | XXXXX |
| THU | XXXX | XXXX | XXXX | XXXX | XXXXX |
| FRI | XXXX | XXXX | XXXX | XXXX | XXXXX |
| SAT | XXXX | XXXX | XXXX | XXXX | XXXXX |
| SUN | XXXX | XXXX | XXXX | XXXX | XXXXX |
| SUM | XXXXX | XXXXX | XXXXX | XXXXX | XXXXXX |

Fig. 2c

```
DISTRIBUTION OF SOLD

STORE1  STORE2  STORE3  STORE4   S U M
MON     XXXX    XXXX    XXXX    XXXX    XXXXX
TUE     XXXX    XXXX    XXXX    XXXX    XXXXX
WED     XXXX    XXXX    XXXX    XXXX    XXXXX
THU     XXXX    XXXX    XXXX    XXXX    XXXXX
FRI     XXXX    XXXX    XXXX    XXXX    XXXXX
SAT     XXXX    XXXX    XXXX    XXXX    XXXXX
SUN     XXXX    XXXX    XXXX    XXXX    XXXXX
SUM     XXXXX   XXXXX   XXXXX   XXXXX   XXXXXX
```

Pie chart overlay: STORE 1 (B), STORE 2 (R), STORE 3 (G), STORE 4 (Y)

COMBINED GRAPHIC AND TEXTUAL DISPLAY SYSTEM

BACKGROUND OF THE INVENTION

1. Field of the Invention

The present invention relates to a display system capable of selectively displaying graphic display data and character display data and a combination of the two types of data on two display units.

2. Description of the Prior Art

In recent years, display systems have become increasingly advanced. Even personal computers are now being provided with display systems capable of the display of not only character information, such as letters and numerals, but also graphic information, such as figures, curves, circle graphs, and histograms.

The display of an actual graph requires the combination of graphic and character information. In the prior art, this has been achieved by storing the combined graphic display data and character display data in an image memory having a capacity sufficient for a display picture and by displaying the data on a single cathode ray tube (CRT). The prior art, however, has suffered from the problem of inadvertent deletion of characters due to interference from the graphic display when adjusting the display, for example, changing colors, enlarging figures, and changing positions, and the problem of an overly crowded display picture when there are too many characters and symbols for graph notations.

SUMMARY OF THE INVENTION

An object of the present invention is to provide a display system able to display graphic data and character data individually or in combination, preventing inadvertent deletion of character data due to interference from graphic data or vice versa, and presenting a visually simple display picture.

In accordance with the present invention there is provided a display system which includes a first image memory storing first image data; a second image memory storing second image data; and a display selection and combination device connected to the first and second image memories. The display selection and combination device has two output terminals connectable to two independent display units, through which the display selection and combination device outputs two display signals selected from the first and second image data in response to a control signal or at least one display signal mixing the first and second image data in response to the control signal.

BRIEF DESCRIPTION OF THE DRAWINGS

Other object and features of the present invention will be clear from the following detailed description with reference to the accompanying drawings, in which.

DESCRIPTION OF THE PREFERRED EMBODIMENTS

Figure 1:
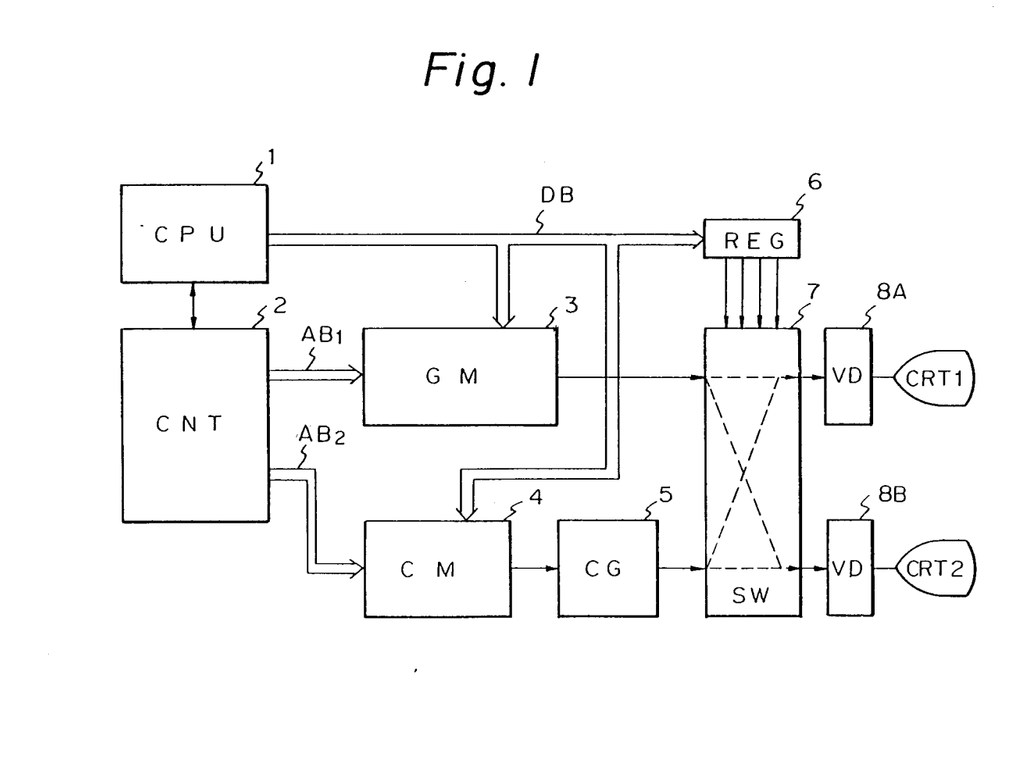
FIG. 1 is a block diagram of an embodiment of a display system according to the present invention.

As illustrated in FIG. 1, a display system in accordance with the present invention comprises a central processor unit (CPU) 1, a timing controller (CNT) 2, a graphic image memory (GM) 3, a character image memory (CM) 4, a character generator (CG) 5, a display selection and combination circuit including a control register (REG) 6 and a display selection circuit (SW) 7, CRT display units CRT1 and CRT2, and video signal converting circuits (VD) 8A and 8B. The above elements are connected to each other by means of a data bus DB, address buses AB1 and AB2, and other buses illustrated in FIG. 1. In this embodiment, data to be displayed are first processed in the CPU. Graphic data, such as figures are stored in the graphic image memory 3 through the timing controller 2. Character data, such as letters, symbols, and numerals are stored in the character image memory 4. Both image memories store the above data in the form of a dot-pattern.

It should be noted that, in the case of character data, only codes corresponding to the characters are stored in the character image memory 4. The above codes are transformed into the dot-pattern signals corresponding to the actual characters recorded in the character generator 5, for example, a read only memory (ROM). The data stored in the image memories 3 and 4 are serially output, in response to addresses on the address buses AB1 and AB2 supplied by the timing controller 2, to the display selection circuit 7 and finally displayed on the CRT display unit CRT1 and/or CRT2 through the video signal converting circuits 8A and/or 8B.

The display content can be selected or changed by keyboard operation or the like. In response to the keyboard operation, the CPU 1 sends a selection signal to the control register 6 through the data bus DB or a display command to the timing controller 2. The storage operation of the image memories 3 and 4 may occur at the desired times, such as at predetermined intervals, at the time of data changes, or only upon request. Therefore, the display may be updated at any desired time.

A feature of the present invention is that any display can be obtained on the CRT displays by changing the selection data in the control register 6 provided by the CPU 1. This will be made clear through the following explanation.

In this embodiment, the control register 6 is a four-bit register and, therefore, can be used for the selection of 16 combinations of displays in accordance with to its control status, as listed in Table 1. In Table 1, "G. ACT" and "C. ACT" respectively stand for a graphic display activate command and a character display activate command. When G. ACT is "1", a graphic display may be provided to the corresponding CRT. On the other hand, when C. ACT is "1", a character display may be provided to the corresponding CRT. In Table 1, furthermore, GRAP. designates a graphic display, CHR. a character display, and GRAP. +CHR. a combined graphic and character display. For example, when the control status is "1001", a graphic display can be presented on the CRT display unit CRT1 and a character display on CRT2. When the status is "1101", a combined graphic and character display can be presented on the CRT display unit CRT1 and a character display on the CRT display unit CRT2.

TABLE 1

| CRT 1 G. ACT | CRT 1 C. ACT | CRT 2 G. ACT | CRT 2 C. ACT | | Display status |
|---|---|---|---|---|---|
| 0 | 0 | 0 | 0 | CRT 1 | No display |
|   |   |   |   | CRT 2 | No display |
| 1 | 0 | 0 | 0 | CRT 1 | GRAP. |
|   |   |   |   | CRT 2 | No display |
| 0 | 1 | 0 | 0 | CRT 1 | CHR. |
|   |   |   |   | CRT 2 | No display |
| 1 | 1 | 0 | 0 | CRT 1 | GRAP. + CHR. |
|   |   |   |   | CRT 2 | No display |
| 0 | 0 | 1 | 0 | CRT 1 | No display |
|   |   |   |   | CRT 2 | GRAP. |
| 1 | 0 | 1 | 0 | CRT 1 | GRAP. |
|   |   |   |   | CRT 2 | GRAP. |
| 0 | 1 | 1 | 0 | CRT 1 | CHR. |
|   |   |   |   | CRT 2 | GRAP. |
| 1 | 1 | 1 | 0 | CRT 1 | GRAP. + CHR. |
|   |   |   |   | CRT 2 | GRAP. |
| 0 | 0 | 0 | 1 | CRT 1 | No display |
|   |   |   |   | CRT 2 | CHR. |
| 1 | 0 | 0 | 1 | CRT 1 | GRAP. |
|   |   |   |   | CRT 2 | CHR. |
| 0 | 1 | 0 | 1 | CRT 1 | CHR. |
|   |   |   |   | CRT 2 | CHR. |
| 1 | 1 | 0 | 1 | CRT 1 | GRAP. + CHR. |
|   |   |   |   | CRT 2 | CHR. |
| 0 | 0 | 1 | 1 | CRT 1 | No display |
|   |   |   |   | CRT 2 | GRAP. + CHR. |
| 1 | 0 | 1 | 1 | CRT 1 | GRAP. |
|   |   |   |   | CRT 2 | GRAP. + CHR. |
| 0 | 1 | 1 | 1 | CRT 1 | CHR. |
|   |   |   |   | CRT 2 | GRAP. + CHR. |
| 1 | 1 | 1 | 1 | CRT 1 | GRAP. + CHR. |
|   |   |   |   | CRT 2 | GRAP. + CHR. |

Figure 2A:
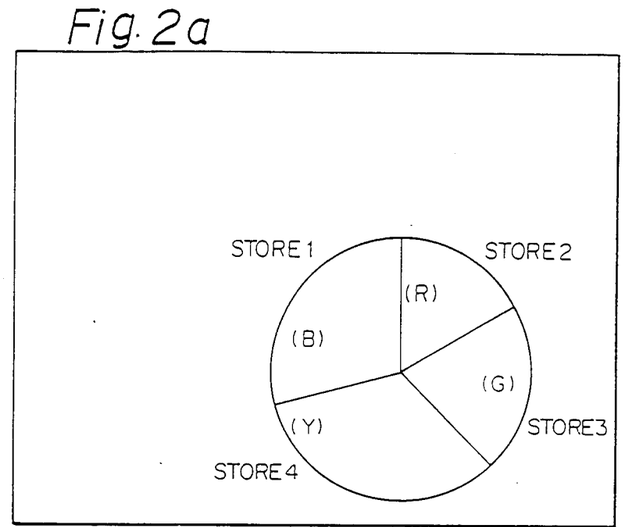
FIGS. 2(a), 2(b), and 2(c) illustrate displays on display units in the display system of FIG. 1.
Figure 2B:
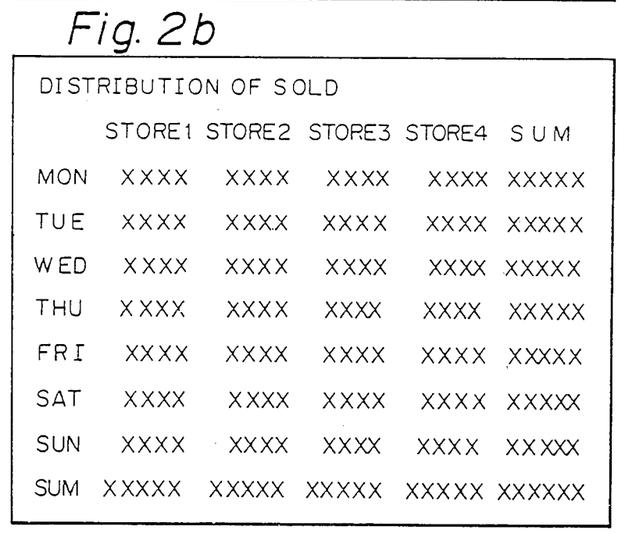
Figure 2C:
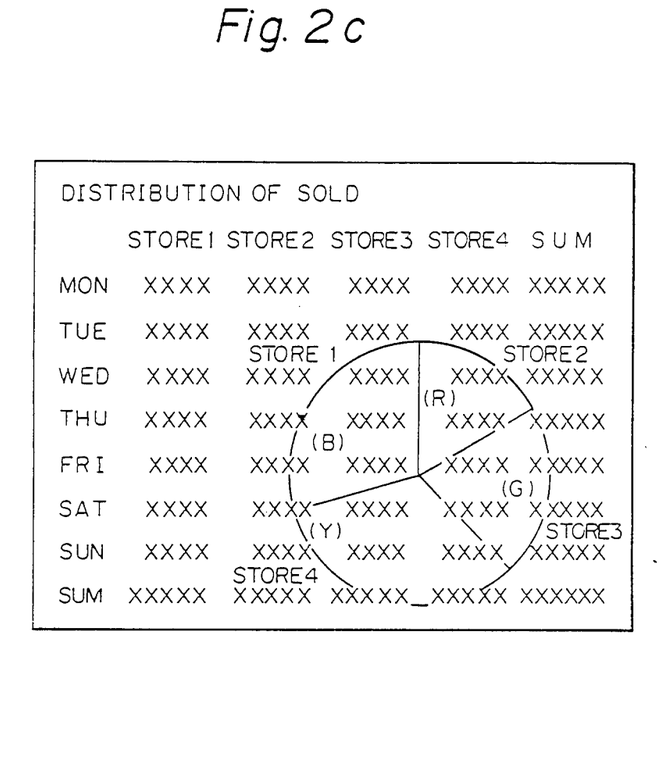

Below is a simplified example where the control status is "1101" and CRT1 and CRT2 are color CRT's having the three fundamental colors of red(R), green(G), and blue(B). FIG. 2 (a) illustrates graphic data comprising a circle graph on a CRT display unit, FIG. 2 (b) is character data comprising graph notations; FIG. 2(c) a combination of the two. The indications (B), (R), (G) and (Y) in the circle graph in FIGS. 2a and 2c represent that the segments are colored blue, red, green, and yellow, respectively.

Figure 3:
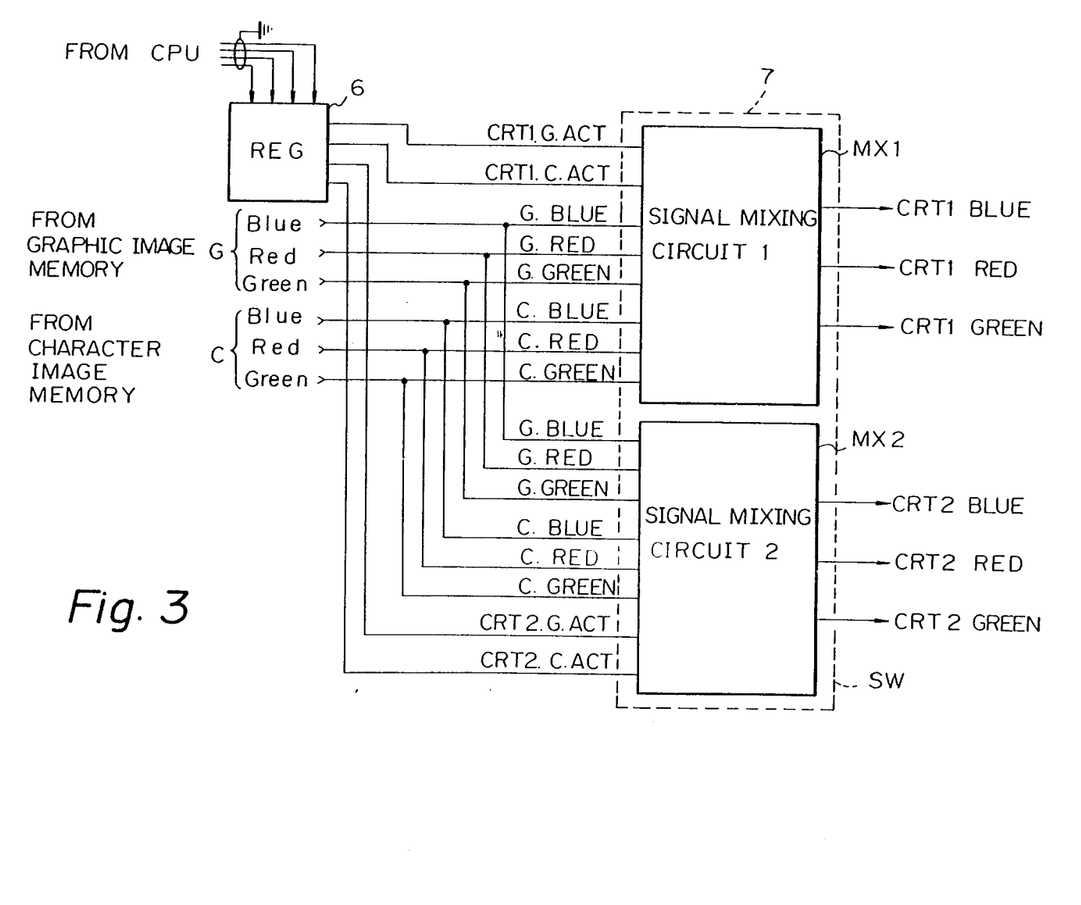
FIG. 3 is a circuit diagram of the connection between the control register and the signal mixing circuits illustrated in FIG. 1 and used in a color CRT display system.

FIG. 3 is a circuit diagram of the connection between the control register 6 and the display selection circuit 7. In FIG. 3, the display selection and combination circuit 7 consists of two signal mixing circuits MX1 and MX2, the outputs of which are connected to the CRT display unit CRT1 and CRT2 through the video signal converting circuits 8A and 8B, respectively. The signals CRT1.G.ACT and CRT1.C.ACT and the signals CRT2.G.ACT and CRT2.C.ACT from the control register 6 are supplied to the input terminals of the signal mixing circuits MX1 and MX2, respectively. Three image signals G. BLUE, G. RED, and G. GREEN for the graphics output from the graphic image memory 3 and three image signals C. BLUE, C. RED, and C. GREEN for the characters output from the character image memory 4 are also supplied to the input terminals of the circuits MX1 and MX2.

Figure 4:
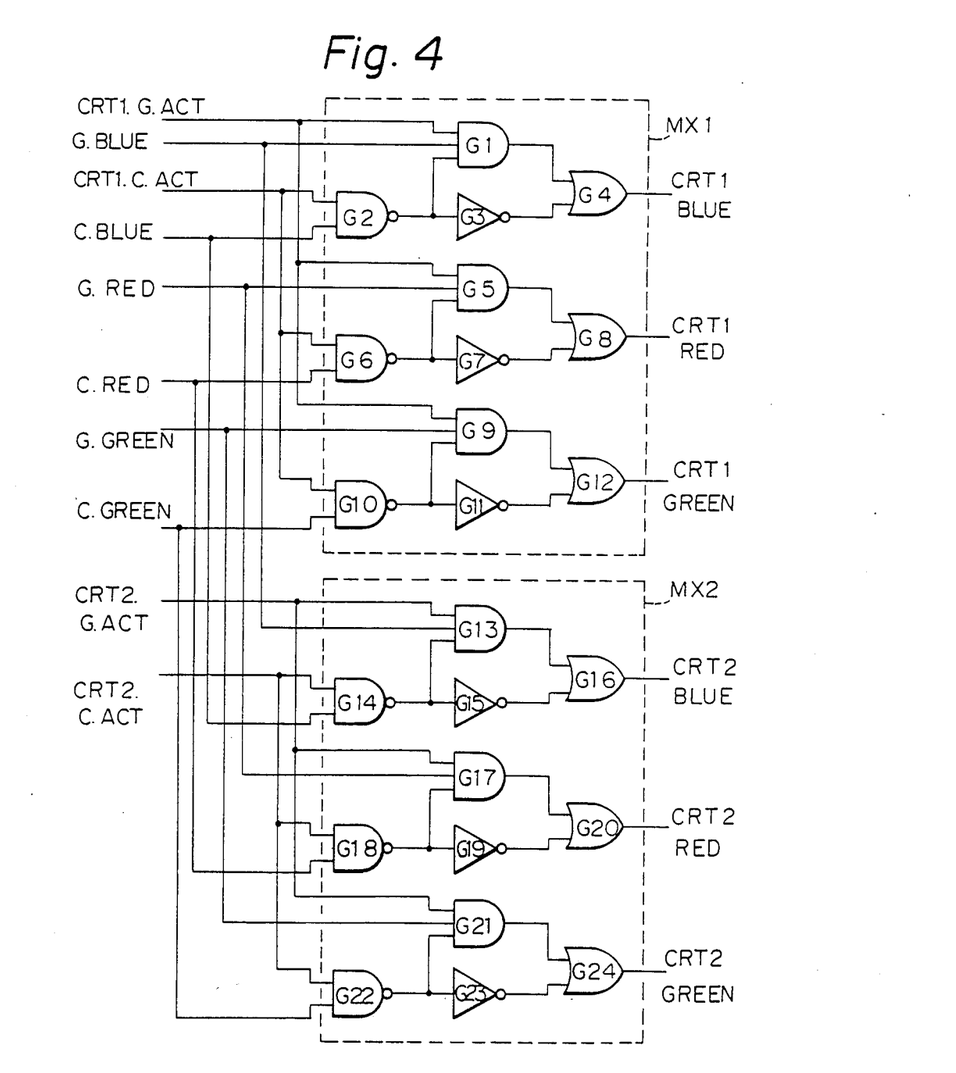
FIG. 4 is a detailed circuit diagram of an example of the signal mixing circuits illustrated in FIG. 3.

FIG. 4 is a detailed circuit diagram of an example of the signal mixing circuits MX1 and MX2. In FIG. 4, gates G1, G5, and G9 represent AND gates; gates G2, G6, and G10 NAND gates; gates G3, G7, and G11 inverters; and gates G4, G8, and G12 OR gates. Gates G13 through G24 in the signal mixing circuit MX2 use the same symbols as the above.

Since the control status is "1101", CRT1.G.ACT, CRT1.C.ACT and CRT2.C.ACT are "1" and CRT2.G.ACT is "0". In this case, C. BLUE applied to the NAND gate G2 in the circuit MX1 is inverted by CRT1.C.ACT being equal to "1", inverted again at the inverter G3, and applied to one of the input terminals of the OR gate G4. In addition, since CRT1.G.ACT is "1", G. BLUE applied to the AND gate G1 is output to another input terminal of the OR gate G4 when the output of the NAND gate G2 is not a logical "1", i.e., C. BLUE is not "1". Therefore, the signal CRT1 BLUE at the output of the OR gate G4 is the combination of the above-mentioned G. BLUE and C. BLUE. When G. BLUE and C. BLUE are both "1", CRT1 BLUE represents C. BLUE rather than G. BLUE by operation of gates G1, G2 and G3. In other words, the direct path of C. BLUE through the inverter G3 acts as a priority selection of the character display which prevents deletion of character information by the graphic display when the graphic display interferes with the character display portions. CRT1 RED and CRT1 GREEN are output by the circuit MX1 after being formed in the same manner as CRT1 BLUE.

On the other hand, since CRT2.G.ACT is "0" and CRT2.C.ACT is "1", G. RED, G. BLUE, and G. GREEN are inhibited at the AND gates G13, G17 and G21, while C. RED, C. BLUE and C. GREEN are output through OR the OR gates G16, G20 and G24 to form CRT2 RED, CRT2 BLUE, and CRT2 GREEN, respectively.

As mentioned above with reference to the drawings, when the control status is "1101", the combined display illustrated in FIG. 2(c) is presented on the color CRT1, and the character display illustrated in FIG. 2(b) is presented on the color CRT2. The combined display in FIG. 2(c) is a mixture of the graphic display in FIG. 2(a) and the character display shown in FIG. 2(b). but the character display dots overlay the graphic display dots where both exist in the same position on the CRT.

As can be easily understood, various combinations of displays on the CRT1 and CRT2 are possible, as indicated in Table 1.

In the above explanation, the CRT display units CRT1 and CRT2 were both color CRTs. They may, however, be both monochrome CRT display units or any combination of the same, as listed in Table 2.

TABLE 2

| CRT 1 | CRT 2 |
|---|---|
| Color | Color |
| Color | Monochrome |
| Monochrome | Color |
| Monochrome | Monochrome |

Figure 5:
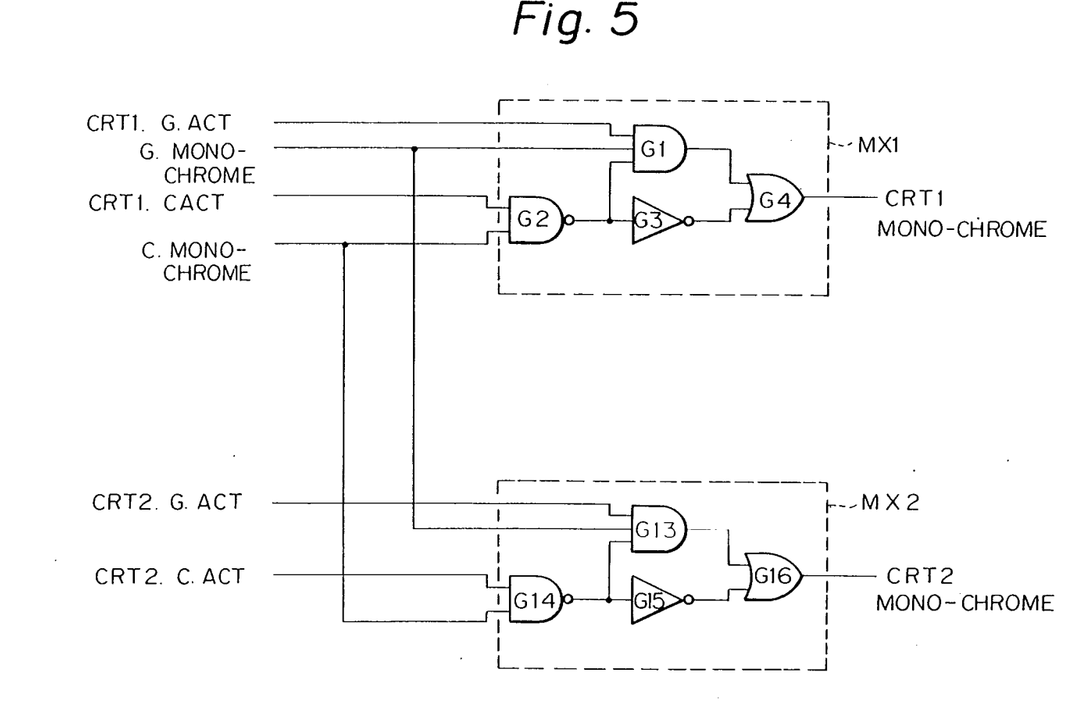
FIG. 5 is a circuit diagram of another embodiment of the signal mixing circuits illustrated in FIG. 3.

When the CRT display units CRT1 and CRT2 are both monochrome, simpler signal mixing circuits as illustrated in FIG. 5 can be used. In FIG. 5, the symbols which are the same as those used in FIG. 4 designate the same type of gates as in FIG. 4.

In the embodiment set forth with reference to FIG. 1, a graphic image memory and character image memory were used. The memories may, however, be both graphic image memories or both character image memories, as listed in Table 3.

TABLE 3

| First image memory | Second image memory |
|---|---|
| Graphic | Character |
| Graphic | Graphic |
| Character | Graphic |
| Character | Character |

According to the signal mixing circuits illustrated in FIGS. 4 and 5, the character display is given priority over the graphic display by means of the priority selection element, i.e., the inverter G3, when the displays interfere with each other on a display unit. The graphic display, however, may be given priority over the character display by a minor change in the above circuits.

According to the present invention, when a person displays information, such as a distribution of sales, to a third person, such as a manager, he requests a display used for selecting the control command on CRT2 by using a keyboard, then requests a graphic display on CRT1 through the display on CRT2. Accordingly, the third person can easily read the desired information without the control data used by the initiator of the display. In addition, the program execution can be displayed on CRT1 and the program list displayed on CRT2. The CRT display units CRT1 and CRT2 can be arranged in any position, for example, can be arranged near each other or apart from each other.

The display system according to the present invention is not limited to CRT display units, but can be applied to any display devices, such as liquid crystal devices and plasma display devices.

We claim:

1. A display system connectable to at least two display devices, said display system comprising:
   first and second image memories for storing first and second image data;
   an input device, associated with the at least two display devices, for generating display control data controlling the selection and combination of the first and second image data for the at least two display devices, the display control data including first and second bits for each of the at least two display devices, the first bit indicating whether the first image data is to be displayed and the second bit indicating whether the second image data is to be displayed;
   control means, comprising a register operatively connected to said input device to receive the display control data, for storing and outputting a control signal controlling selection and combination of the first and second image data for display on each of the at least two display devices; and
   display selection and combination means, operatively connected to said first and second image memories, said register in said control means and the at least two display devices, for selecting and combining the first and second image data in dependence upon the control signal, said display selection and combination means comprising signal mixing circuits, each operatively connected to said register, said first and second image memories and a corresponding one of the at least two display devices, each of said signal mixing circuits comprising:
   a NAND gate having inputs operatively connected to said first image memory and to said register to receive the first bit of the display control data, and producing an output;
   an AND gate having inputs operatively connected to said second image memory, said NAND gate and to said register to receive the second bit of the display control data, and producing an output;
   an inverter having an input operatively connected to the output of said NAND gate and producing an output; and
   an OR gate having inputs operatively connected to said AND gate and said inverter and providing an output to the corresponding one of the at least two display devices.

2. A display system connectable to at least two display devices, said display system comprising:
   first and second image memories for storing first and second image data each including red, blue and green bits;
   an input device, associated with the at least two display devices, for generating display control data controlling the selection and combination of the first and second image data for the at least two display devices, the display control data including first and second bits for each of the at least two display devices, the first bit indicating whether the first image data is to be displayed and the second bit indicating whether the second image data is to be displayed;
   control means, comprising a register operatively connected to said input device to receive the display control data, for storing and outputting a control signal controlling selection and combination of the first and second image data for display on each of the at least two display devices; and
   display selection and combination means, operatively connected to said first and second image memories, said register in said control means and the at least two display devices, for selecting and combining the first and second image data in dependence upon the control signal, said display selection and combination means comprising signal mixing circuits, each having inputs operatively connected to said register and said first and second image memories, and providing an output to a corresponding one of the at least two display devices, each of said signal mixing circuits comprising:
   first, second and third NAND gates, having inputs operatively connected to said register and said second image memory, for NANDing the second bit of display control data with the blue, red and green bits of the second image data, respectively, and producing outputs;
   first, second and third inverters having inputs operatively connected to the outputs of said first, second and third NAND gates, respectively and producing outputs;
   first, second and third AND gates, having inputs operatively connected to said register, said first image memory and said first, second and third NAND gates, respectively, for ANDing the first bit of display control data with the blue, red and green bits of the first image data and the output of said first, second and third NAND gates, respectively, and producing outputs; and
   first, second and third OR gates, having inputs operatively connected to said first, second and third AND gates and inverters, respectively, and the corresponding one of the at least two display devices, for ORing the outputs of said first, second and third AND gates and inverters, respectively.

* * * * *

UNITED STATES PATENT AND TRADEMARK OFFICE
CERTIFICATE OF CORRECTION

PATENT NO. : 4,684,935

DATED : August 4, 1987

INVENTOR(S) : Fujisaku et al.

It is certified that error appears in the above-identified patent and that said Letters Patent is hereby corrected as shown below:

Column 2, line 54, delete "to".
Column 4, line 31, delete "OR" (first occurrence).
Column 6, line 58, "6f" should be --of--.

Signed and Sealed this

Twenty-ninth Day of December, 1987

Attest:

DONALD J. QUIGG

Attesting Officer

Commissioner of Patents and Trademarks